United States Patent

[11] 3,595,521

| [72] | Inventor | Werner Lorentz |
| | | Hamburg, Germany |
| [21] | Appl. No. | 845,150 |
| [22] | Filed | July 28, 1969 |
| [45] | Patented | July 27, 1971 |
| [73] | Assignee | Alfons Haar |
| | | Maschinenbau, Hamburg, Germany |
| [32] | Priority | Aug. 8, 1968 |
| [33] | | Germany |
| [31] | | P 17 75 411.9 |

[54] GATE VALVE WITH HYDRAULICALLY OPERATED SHUTOFF DEVICE
12 Claims, 2 Drawing Figs.

[52] U.S. Cl. ................................................. 251/212, 251/63.5
[51] Int. Cl. ................................................. F16k 3/00, F16k 31/12
[50] Field of Search ........................................... 251/212, 63.5

[56] References Cited
UNITED STATES PATENTS

| 1,042,982 | 10/1912 | Sliger | 251/212 X |
| 1,802,564 | 4/1931 | Lacey | 251/212 |
| 1,986,600 | 1/1935 | Pigott | 251/212 X |

*Primary Examiner*—Arnold Rosenthal
*Attorney*—Irving M. Weiner

ABSTRACT: The valve comprises a valve housing with a flow passage and two shutoff members arranged for transverse displacement to and from another in the flow passage. The shutoff members are actuated each by a hydraulic servomotor mounted at the housing. One servomotor is associated with a delay element by which the closing movement of the respective shutoff member is delayed with respect to the closing movement of the other member. Pressure peaks with rapid valve closing can be avoided by this construction. The valve is suitable for remote and automatic flow control of fluids.

GATE VALVE WITH HYDRAULICALLY OPERATED SHUTOFF DEVICE

BACKGROUND OF THE INVENTION

This invention relates to gate valves, and more specifically to a gate valve having a housing with hydraulically operated shutoff device.

It is the object of the present invention to provide a gate valve which can be closed rapidly especially by remote control.

SUMMARY OF THE INVENTION

According to the present invention, the gate valve comprises a housing and a hydraulically operated shutoff device and is characterized in that its shutoff device comprises two shutoff members displaceable transversely to the flow direction for closing the gate valve and a hydraulic servomotor is provided for each of the two shutoff members for moving the same. In this manner the two shutoff members and thus the two hydraulic servomotors need only perform half of the otherwise required length of stroke and this contributes considerably to the abridgment of the closing and opening operations.

A substantial feature of the present invention consists in that a delay element is associated with the servomotor for one of the shutoff members, the delay element operating its associated shutoff member in such a manner that the latter reaches its closing position in a time lag with respect to the other shutoff member. This feature of the valve substantially contributes to a considerable reduction or even elimination of the height of pressure peaks occuring with a rapid closing movement on the pressure side. The fact that one shutoff member reaches its final closing position somewhat later than the other shutoff member results in a delay in decreasing the still free cross-sectional area of flow during the last part of the closing operation and consequently, even with a very rapid closing movement of the shutoff members a pressure peak may occur only to a very small height.

A further feature of the invention consists in that means are provided for the delayed shutoff member exerting a substantially constant closing force on the shutoff member. If a pressure peak should be built up by especially rapid closing movement, the pressure of this peak would act against the shutoff members and particularly against the last closing shutoff member so that the closing movement of the shutoff members and particularly of the delayed-action shutoff member is retarded. This deceleration of the closing movement of this shutoff member in turn causes a reduction of the pressure peak which had just begun to build up. As a result, this measure ensures that the gate valve is not subjected to a dangerous pressure peak even in the case of an extremely rapid closing movement.

For example, experience has shown that in a gate valve designed for an intake pressure of six atmospheres excess pressure (atü) and a volume rate of flow of 1 m.³/min. the pressure peak occurring with an extremely rapid closing movement of the gate valve is small at a volume rate of approximately 0,6 m.³/min. and limited e.g. to a pressure of 7.2 atmosphere excess pressure.

As a still further feature of the invention, the valve housing enclosing the shutoff members has its flow passage formed as a Venturi tube with the two shutoff members being arranged approximately at its place of narrowest cross section. In this manner a reduction of the passage cross section and thus of the strokes of the shutoff members and the pistons of the servomotors is achieved. Moreover, the specific pressure load of the gate valve is substantially reduced. The shutoff members consist of two plane steel plates which can be hardened and finished.

In a preferred embodiment of the invention the movement of each of the shutoff members is effected by the piston of the respective hydraulic servomotor, said piston being acted upon by a hydraulic fluid on one side for the opening movement and by resilient means on the other side for the closing movement. Preferably the servomotors of the two shutoff members are connected hydraulically in series, one servomotor being connected to a conduit coming from a hydraulic pressure source and the other servomotor being connected to the first servomotor by means of a further conduit.

In this manner a delay in the closing movement of the servomotor connected hydraulically to the first servomotor is achieved with particularly simple means. The resilient means which are especially spiral springs exert a substantially constant force onto the pistons of the servomotors and move their associated shutoff members into the closing position. As soon as the first shutoff member the servomotor of which is directly connected to the hydraulic pressure source has reached its final closing position, the hydraulic pressure medium in the servomotor of the other shutoff member is flowing off with a certain delay for this pressure medium must flow off through the additionally provided conduit connecting the two servomotors. This time lag prevents the occurrence of considerable or even dangerous pressure peaks at the shutoff members.

The gate valve is constructed preferably in such a manner that its passage does not extend beyond the radial flange at the downstream side of the valve housing.

In another embodiment of the invention, a tapered downstream section of the passage is formed as diffuser cone having a relatively small angle of divergence and extending in axial direction beyond the radial flange of the valve housing on its downstream side. Although this diffuser cone is of greater length which naturally ensures conversion of flow velocity into flow pressure with particularly high efficiency the advantage is still existent that the flanged valve housing has a particularly small installation length in axial direction.

Another feature of the valve according to the invention consists in that a place at the upstream section of the Venturi tube and its constriction are each provided with a connection socket for an instrument measuring the volume rate of flow in the valve passage. This instrument can be used to control the hydraulic medium supply to the servomotors and to shutoff automatically the gate valve by means of the two motors when a predetermined flow rate is exceeded. Further features will be apparent from the following description.

BRIEF DESCRIPTION OF THE DRAWING

An embodiment of the invention is described by way of example and with reference to the accompanying drawings, in which.

DESCRIPTION OF THE PREFERRED EMBODIMENT

Figure 1:
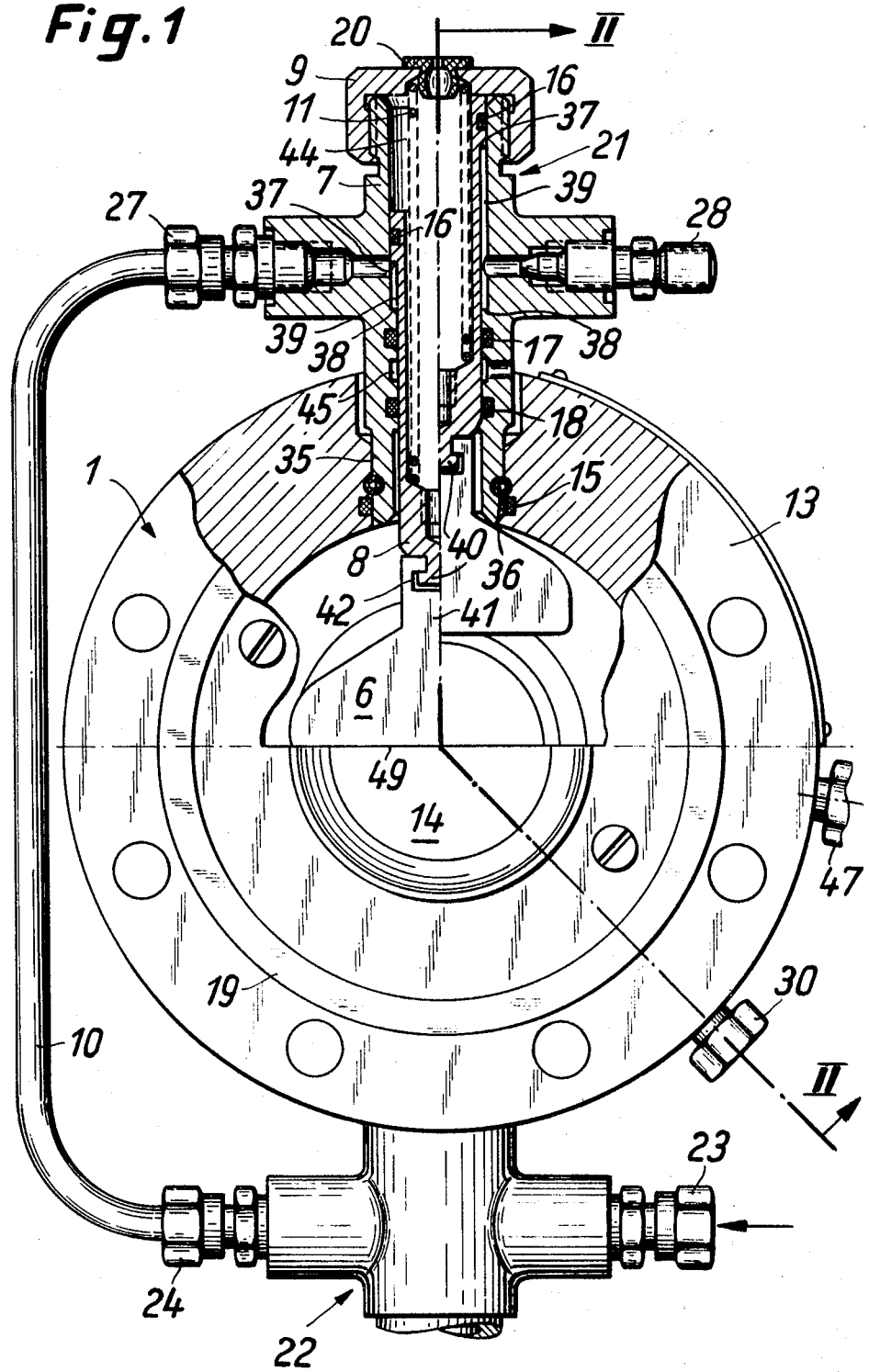
FIG. 1 is partly axially sectioned view of a gate valve according to the invention.

With reference now to the drawings, a gate valve according to the invention comprises a flanged housing 1 which has two radial flange surfaces 25 and 13 and in which two plate-shaped shutoff members 6 and 14 are arranged so as to be radially displaceable transversely to the flow direction. These shutoff members are of identical construction and contact each other in their closing position along the line 49. For operating the two shutoff members 6 and 14 two hydraulic servomotors 21 and 22 are provided diametrically opposite each other. These servomotors are of fully identical construction but nevertheless they have been identified by different reference numbers for reasons indicated here-below. Hydraulic fluid supplied passes from a hydraulic pressure source through a connection socket 23 into the servomotor 22 to actuate the piston thereof and flows then through a connection socket 24 and a conduit 10 to a connection socket 27 from where it passes into the servomotor 21 to act on the piston thereof. The working cylinder of the servomotor 21 is provided with a vent valve 28 in a place corresponding to that where the servomotor 22 has attached the connection socket 23. The two flange surfaces 25 and 13 of the valve housing 1 are provided with sealing rings 19 by by means of which the valve housing is sealed to any connected fittings or pipes.

The flow passage of the valve is formed as a Venturi tube the upstream portion 48 of which is formed by the gate valve housing 1. As can be seen from the upper half of FIG. 2, the downstream portion 29 has a relatively large angle of divergency and is formed by a divergent passage member 2 which is inserted in the housing 1 by means of a centering projection 31. On the downstream side the divergent member 2 does not extend beyond the radial flange surface 13 of the housing 1.

Figure 2:
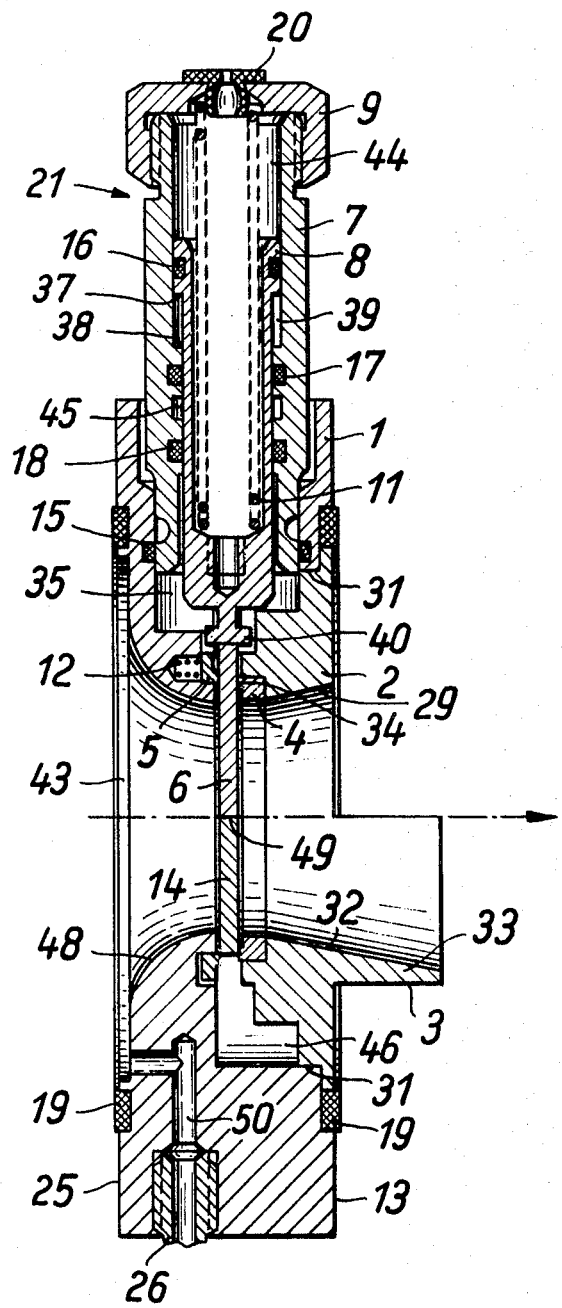
FIG. 2 is a cross section on line II–II of FIG. 1.

As shown in the lower half of FIG. 2, a divergent passage member 3 forms a diffuser cone 32 which has a smaller angle of divergency than the downstream portion 29. This divergent member 3 is also centered in the gate valve housing 1 by means of a centering projection 31 and has an end 33 extending beyond the radial flange surface 13 of the housing.

The two shutoff members 6 an 14 of the valve are arranged approximately at the narrowest place of the Venturi tube between the upstream portion 48 and the downstream portion 29, 32 thereof. A metallic sealing ring 4 having a sealing surface 34 is fixedly mounted in the divergent passage members 2 and 3 with the two shutoff members 6 and 14 when closed being urged against said sealing surface 34 by he fluid medium on their upstream side. Arranged on the upstream side of the shutoff members 6, 14 is a pressure ring 5 which is urged against the two shutoff members 6 and 14 by means of springs 12.

Each of the two hydraulic servomotors comprises a cylinder 7 and a piston 8. For fitting these cylinders 7 the gate valve housing 1 is provided with bores 35. The cylinders are held in these bores by means of clamping pins 36.

The outwardly open cylinders 7 are closed by a screwcap 9 with a bore in which a plug 20 of synthetic plastics material is arranged. The plug 20 permits, if required, access to the interior of the cylinder without having to remove the screwcap 9.

The piston 8 is constructed as an annular piston with the hydraulic pressure acting upon an annular surface 37. For this purpose, hydraulic pressure fluid is passed into an annular working space 39 formed between the annular surface 37 of the piston 8 and an offset portion 38 of the cylinder 7.

The piston 8 is formed substantially as sleeve and connected to the associated shutoff member 6 or 14 by means of a mushroom head 40 which, as seen in longitudinal secton, is of T-shaped design but has a cross secton in the form of a circular disk. The two shutoff members 6 and 14 of the gate valve are each provided with a neck portion 41 with a T-shaped groove 42 in which the T-shaped mushroom head 40 of the piston 8 is engaged.

The two shutoff members 6 and 14 are each moved into their closing position by a spring 11 which is supported at one end against the piston 8 and at the other end against the screwcap 9. A sealing ring 16 seals the annular working space 39 from the spring chamber 44. Similarly, a sealing ring 17 seals this working space 39 from an annular leak oil drain space 45. On the other side of the leak oil drain space 45 the piston 8 is sealed by a sealing ring 18. The cylinder 7 is sealed by a sealing ring 15 from the bore 35 of the gate valve housing 1. On the upstream side of the Venturi tube the flange surface 25 is provided with a recess 43 which communicates through a bore 50 with a connection socket 30 into which the connecting member 26 of a measuring instrument is screwed. Similarly, an annular space 46 into which the bores 35 for the two servomotors 21 and 22 open communicates with a measuring connection socket 47 through bores not specifically shown in the drawings. This annular space 46 communicates with the region of the narrowest constriction of the Venturi tube between the upstream portion 48 and the downstream portions 29 and 32, respectively, especially when the shutoff members of the gate valve are opened. These two sockets 30 and 47 can be connected to a pressure gauge and a differential pressure gauge, respectively, and permits to measure the flow rate and the flow volume and it is readily possible to operate the gate valve as proposed by the invention by remote control in dependence on the flow rate.

I claim:

1. Gate valve for remote and automatic flow control of fluids comprising a valve housing having therein a flow passage, two shutoff members arranged for transverse displacement to and from another in the flow passage for closing and opening the same, and two hydraulic servomotors mounted at the housing and connected to a source of hydraulic pressure medium each of which motors being associated with one shutoff member for its actuation, said flow passage being formed as a Venturi tube with the shutoff members arranged at the narrowest constricted cross section thereof.

2. Gate valve for remote and automatic flow control of fluids comprising a valve housing having formed therein a flow passage, two shutoff members arranged for transverse displacement to and from another in the flow passage for closing and opening the same, two hydraulic servomotors, connected to a source of hydraulic pressure medium each of which motors being associated with one shutoff member for its actuation, and a delay element associated with one of the hydraulic servomotors adapted to delay the closing movement of the respective shutoff member with respect to the closing movement of the other shutoff member, and resilient means exerting a force on said delayed shutoff member substantially constant along the closing stroke.

3. Gate valve in accordance with claim 1, wherein the flow passage is formed as a Venturi tube with the shutoff members arranged at the narrowest constricted cross section thereof.

4. Gate valve in accordance with claim 1, wherein each shutoff member is provided with a T-shaped groove and the piston of the respective servomotor is formed with a T-shaped mushroom head for engagement with said groove.

5. Gate valve in accordance with claim 1, wherein the movement of each shutoff member is effected by the piston of the respective servomotor, said piston being acted upon by a hydraulic medium on the one side for the opening movement and by resilient means on the other side for the closing movement.

6. Gate valve in accordance with claim 1, wherein the valve housing consists of a flange body having formed therein an axial passage bore and two diametrically opposite bores for the connection of the servomotors as well as of a tube portion centered in the passage bore and forming at least a part of a Venturi tube.

7. Gate valve in accordance with claim 6, wherein the downstream portion of the Venturi tube is formed as diffuser by said tube portion and the upstream portion of the Venturi tube is formed directly by the passage of the flange body.

8. Gate valve in accordance with claim 7, wherein the diffuser is formed with a relatively small angle of divergence and extends beyond the radial flange surface of the flange body at its downstream side.

9. Gate valve in accordance with claim 1, wherein a first sealing ring is firmly mounted in the housing at the downstream side of the two shutoff members and a second sealing ring supported in the housing is resiliently pressed against the upstream side of the shutoff members whereby the flow passage is sealed against the servomotors.

10. Gate valve in accordance with claim 1, wherein the inlet place and the constriction of the Venturi tube passage are each provided with a bore for measurement of the flow rate by the pressure difference.

11. Gate valve in accordance with claim 2, wherein the delayed shutoff member is moved into the closing position by resilient means exerting a force on the member which is substantially constant along the closing stroke.

12. Gate valve in accordance with claim 2, wherein the nondelayed servomotor is connected directly to the source of the hydraulic pressure medium and the delayed servomotor is connected to said source through the intermediary of the nondelayed motor and a conduit connecting the working spaces of both motors.